United States Patent
Fallon et al.

(10) Patent No.: US 7,840,828 B2
(45) Date of Patent: Nov. 23, 2010

(54) METHOD AND DEVICE FOR POWER MANAGEMENT ACCORDING TO PRIORITY PARAMETERS CONTAINS IN DATA PACKETS

(75) Inventors: Henri Fallon, Paris (FR); Stephane De Marchi, Paris (FR)

(73) Assignee: DIBCOM, Palaiseau (FR)

( * ) Notice: Subject to any disclaimer, the term of this patent is extended or adjusted under 35 U.S.C. 154(b) by 717 days.

(21) Appl. No.: 11/790,491

(22) Filed: Apr. 25, 2007

(65) Prior Publication Data

US 2007/0254617 A1 Nov. 1, 2007

(30) Foreign Application Priority Data

Apr. 25, 2006 (EP) .................................. 06290672

(51) Int. Cl.
*G06F 1/26* (2006.01)
(52) U.S. Cl. ................. 713/324; 713/300; 713/320; 713/323
(58) Field of Classification Search ................. 713/324, 713/300, 320, 323
See application file for complete search history.

(56) References Cited

U.S. PATENT DOCUMENTS

| | | | |
|---|---|---|---|
| 6,907,028 B2 * | 6/2005 | Laiho et al. ................. 370/347 |
| 7,155,263 B1 * | 12/2006 | Bergamo ..................... 455/574 |
| 7,548,519 B2 * | 6/2009 | Motegi et al. ................ 370/318 |
| 7,561,594 B2 * | 7/2009 | Terry et al. .................. 370/458 |
| 2003/0002499 A1 | 1/2003 | Cummings et al. |
| 2004/0120285 A1 | 6/2004 | Paila et al. |
| 2005/0041696 A1 | 2/2005 | Pekonen |
| 2005/0157650 A1 * | 7/2005 | Laiho et al. .................. 370/235 |
| 2006/0050812 A1 * | 3/2006 | Hietala et al. ............... 375/308 |
| 2006/0245488 A1 * | 11/2006 | Puputti et al. ............... 375/238 |
| 2006/0258324 A1 * | 11/2006 | Vare et al. ................. 455/343.3 |

FOREIGN PATENT DOCUMENTS

| | | |
|---|---|---|
| GB | 2 401 759 A | 11/2004 |
| GB | 2 402 307 A | 12/2004 |
| GB | 2 406 488 A | 3/2005 |
| WO | WO 03/001338 A3 | 1/2003 |
| WO | WO 2006/030329 A1 | 3/2006 |

* cited by examiner

*Primary Examiner*—Nitin C Patel
(74) *Attorney, Agent, or Firm*—McKenna Long & Aldridge LLP

(57) ABSTRACT

This demodulator for signals transmitted by bursts of data packets and the corresponding method comprise receiving from a separate processor identifiers of bursts to be processed, filtering the signals to retrieve the bursts whose identifiers were received, processing said retrieved bursts, receiving from said separate processor timing information associated with the identifiers of bursts to be processed; and power management to drive at least some components of said demodulator between an idle state and an active state depending upon said timing information.

18 Claims, 3 Drawing Sheets

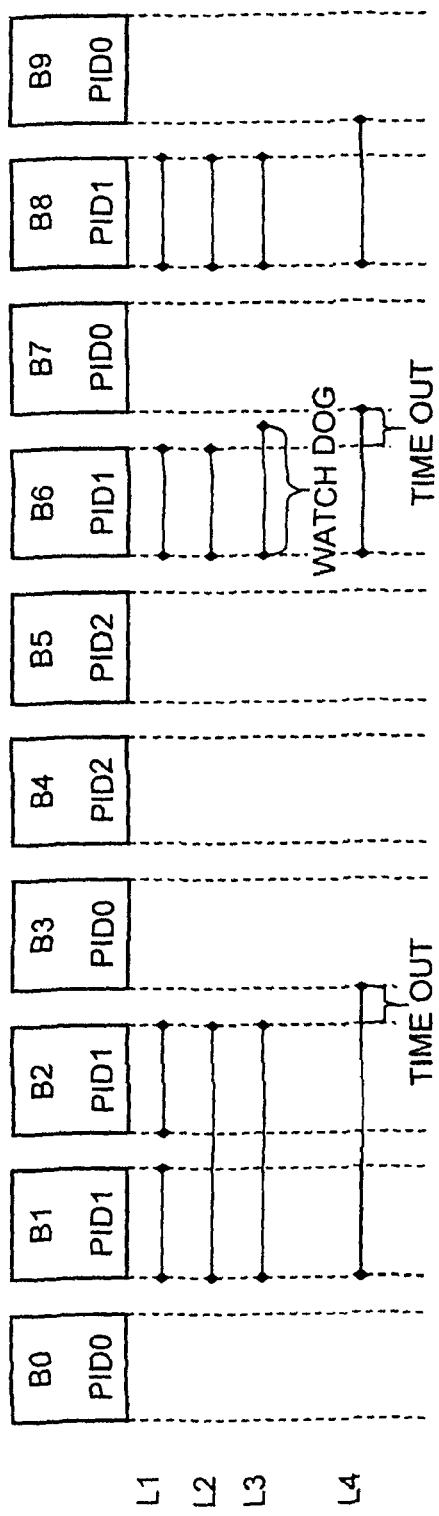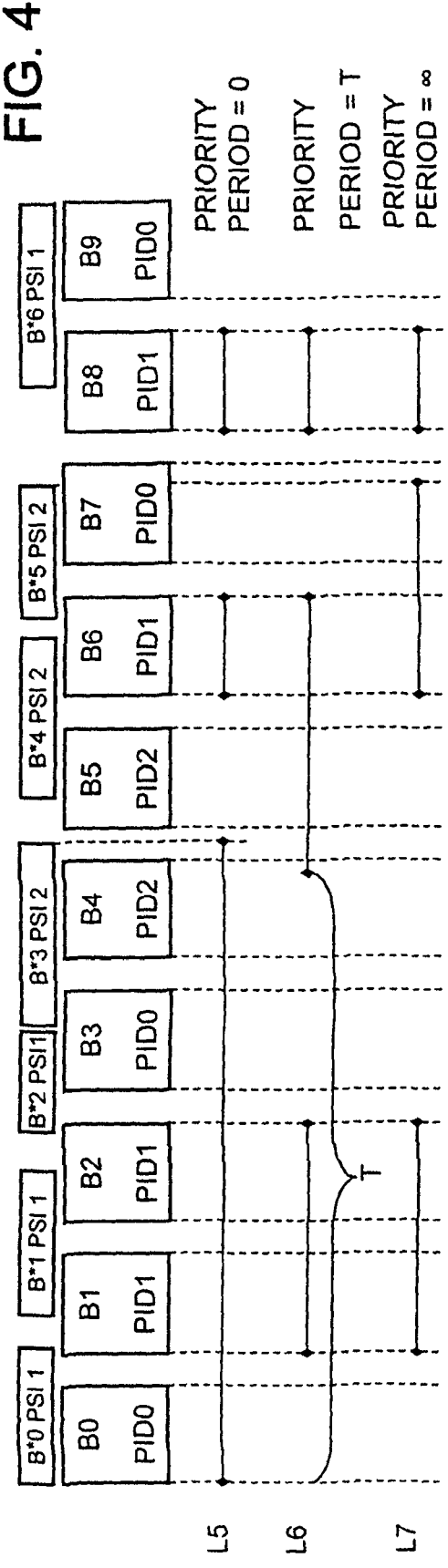

METHOD AND DEVICE FOR POWER MANAGEMENT ACCORDING TO PRIORITY PARAMETERS CONTAINS IN DATA PACKETS

This application claims priority from European Application filed under EPO 06 290672.2 on Apr. 25, 2006 which is hereby incorporated by reference in its entirely.

BACKGROUND OF THE INVENTION

The present invention concerns the power management of a receiver for signals transmitted in bursts of data packets.

When signals are transmitted in bursts, it is convenient to reduce the power provided to some components between the bursts in order to reduce the overall power consumption of the receiver.

This is the case, for example, in receivers for digital television in which data can be time sliced and spread over several bursts, each burst being identified by an identifier also called PID. More precisely, the bursts comprise several packets, each of them with the same PID.

Usually, in such receivers, a host processor of the receiver commands a co-processor implemented on a different chip and which, for example, is in charge of the demodulation of the data bursts.

Some existing receivers have a power management function implemented in the host processor which sends instructions to other components, namely the tuner and the demodulator, to drive them to switch between an active state and an idle state.

However, performing such a power management requires computation time from the host processor and induces an increase of the traffic on the bus between the host processor and the co-processor.

Furthermore, this bus must be kept available in order to transmit instructions to switch to the active state without delay to avoid missing bursts of data.

Due to these drawbacks, such a power management is not efficient.

The aim of the present invention is to solve these problems by providing an efficient demodulator with power management and a corresponding method and program.

SUMMARY OF THE INVENTION

To this effect, the invention relates to a demodulator for signals transmitted by bursts as recited in claim 1 and a corresponding method as recited in claim 14. The invention also relates to a processor program as recited in claim 18.

Thanks to the transmission of timing information and the performing of the power management by the co-processor of the demodulator, the power management is more efficient. Furthermore, the host processor and the bus between the host processor and the co-processor are more available for other functions.

BRIEF DESCRIPTION OF THE DRAWINGS

Other features and advantages of the invention will be apparent from the description illustrated by the drawings in which:

FIGS. 3, 4 and 5 represent time charts of several embodiments of the determination of idle and active periods.

DESCRIPTION OF PREFERRED EMBODIMENTS

Figure 1:
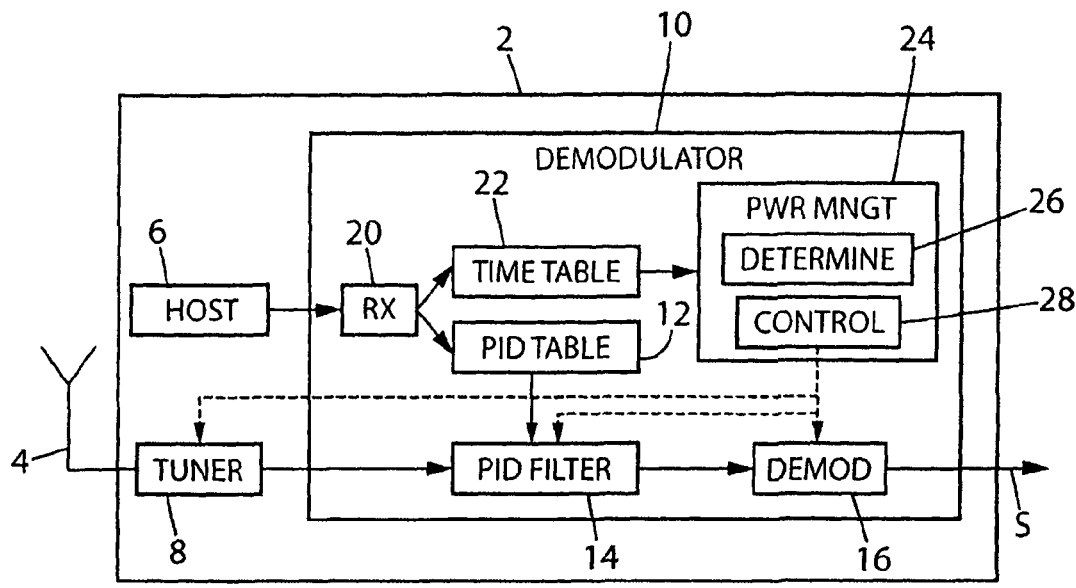
FIG. 1 is a block diagram of a receiver according to the invention.

FIG. 1 represents a receiver 2 according to the present invention and adapted to receive radio frequency (RF) signals like digital television signals using the MPEG-2 format in a DVB-H or DVB-T transmission.

Such a transmission comprises programs spread over several bursts of data packets. Each packet of a burst of data is transmitted with a packet identifier or burst identifier called PID.

Packets are further segmented into elementary streams, referenced to as ES, and multiplexed over transmission channels.

According to the current standards of transmission, each packet comprises timing information about the time period between this packet and the next burst of packets with the same PID.

Also according to these standards, some data does not have timing information. This can be the case for service data bursts, or metadata bursts, also called program service information (PSI) or service information (SI), which are transmitted in available time slots, or any other services.

The receiver 2 comprises an antenna 4 to receive the RF signals, a host processor 6 and a tuner 8 whose output is connected to a demodulator 10.

Conventionally, the demodulator 10 comprises a PID table 12 containing a list of PIDs identifying, for each reception frequency or channel frequency, the bursts of data packets which must be processed. A PID filter 14 is connected downstream from the tuner 8 and has access to this PID table 12 in order to filter the signals and retrieve the bursts of data with PIDs which are in the table 12.

The output of the PID filter 14 is fed into a demodulation unit 16 which applies the relevant demodulation or equalization processing to derive an information signal called S, supplied to other processing circuits with which the receiver 2 is associated.

In the embodiment described, the demodulator 10 also comprises a receiving unit 20 adapted to receive from the host processor 6, some PID to be registered in the PID table 12 and the timing information associated with these PIDs. The timing information is memorized in a corresponding table 22 within the demodulator 10.

The demodulator 10 also comprises a power management unit 24 which is adapted to drive components of the receiver between idle and active states depending upon the timing information in the timing table 22.

In the example described, the power management unit 24 drives together the tuner 8, the PID filter 14 and the demodulation unit 16 between the active and idle states. When in idle state, no more data is received or processed as every receiving component is powered off.

More precisely, the power management unit 24 comprises an element 26 for determination of idle and active periods and a control element 28 to drive the components between idle and active states respectively during said periods.

Advantageously, all or part of these units and elements are integrated in a co-processor built in the demodulator chip.

Figure 2:
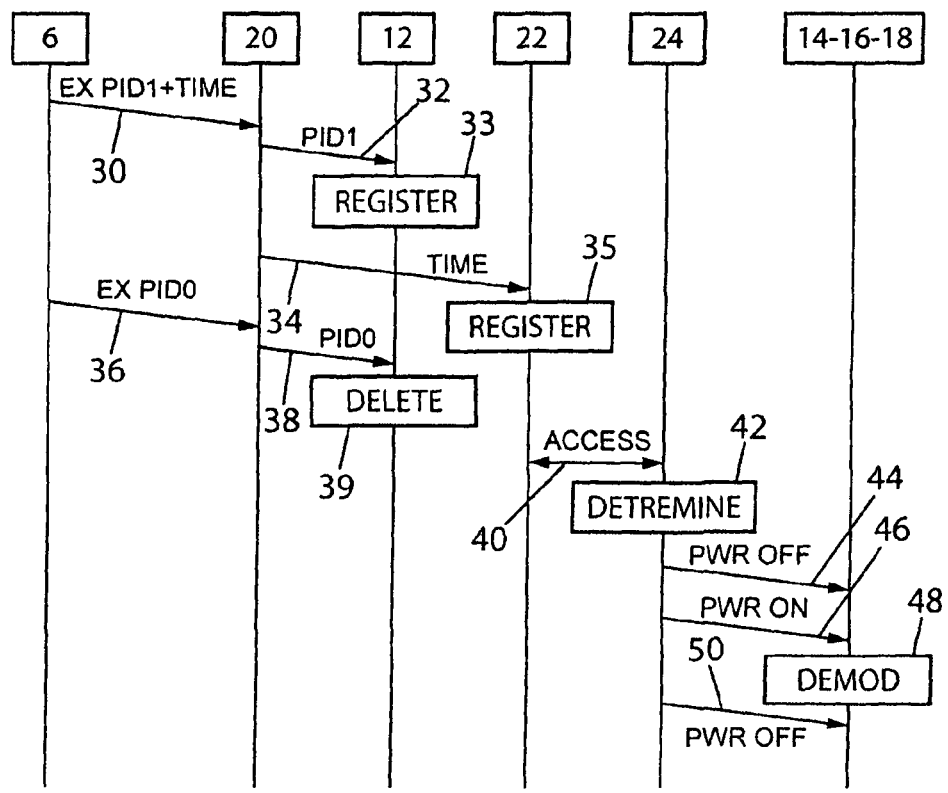
FIG. 2 is a flow chart of the method according to the invention.

Referring now to FIG. 2, the general functioning of this device will now be described.

In a step 30, the host processor 6 transmits to the demodulator 10 a new PID that must be registered in the PID table for further processing.

In the described example, the PID1 is transmitted together with the associated timing information in a single message.

This message is received by the receiving means 20 which separate the PID and the timing information to transmit them respectively to the PID table 12 during a step 32 and to the timing table during a step 34.

This leads to a step 33 of registering the PID1 in the PID table 12 and to a step 35 of registering the timing information associated with the PID1 in the timing table 22.

The host processor 6 also sends a message during a step 36 to remove a PID, namely PID0 from the PID table.

In the example, the message sent by the host processor 6 to delete a PID from the table 12, carries only this PID. This message is received by the receiving unit 20 which transmits it to the PID table 12 during a step 38 in order to remove PID0 from the PID table 12 during a step 39.

In the embodiment described, the power management unit 34 is adapted to detect any change of the PID table 12 and of the timing table 22. Accordingly, the power management unit 34 reads the PID table 12 and the timing table 22 during a step 40 followed by a step 42 of determination of idle and active periods upon the retrieved timing information.

More precisely, as indicated above, the timing information comprises at least the duration of the time period before the following burst with the associated PID.

The determination element 26 is adapted to memorize the time of the instant of reception of the last burst for each PID of the PID table 12. Then, by use of the timing information, it is adapted to determine the instant of reception of the next bursts to be processed.

More precisely, in the embodiment described, the determination element 26 is adapted to determine and memorize the instant of the next active period and its duration.

The determination of the active and idle periods will be described in more details with reference to FIGS. 3, 4 and 5.

Once the next active period is determined, the power management unit 24 drives the components of the receiver 2 between idle and active states for example by sending a first power OFF instruction in a step 44. Later, it sends a power ON instruction in a step 46 to perform a step 48 of reception and demodulation of a burst with the PID1 followed by a step 50 in which the power management element 24 powers OFF the components of the receiver 2.

In the example described, all the components are switched collectively between the active and idle states. Alternatively, the power management unit drives each component separately.

Figure 5:
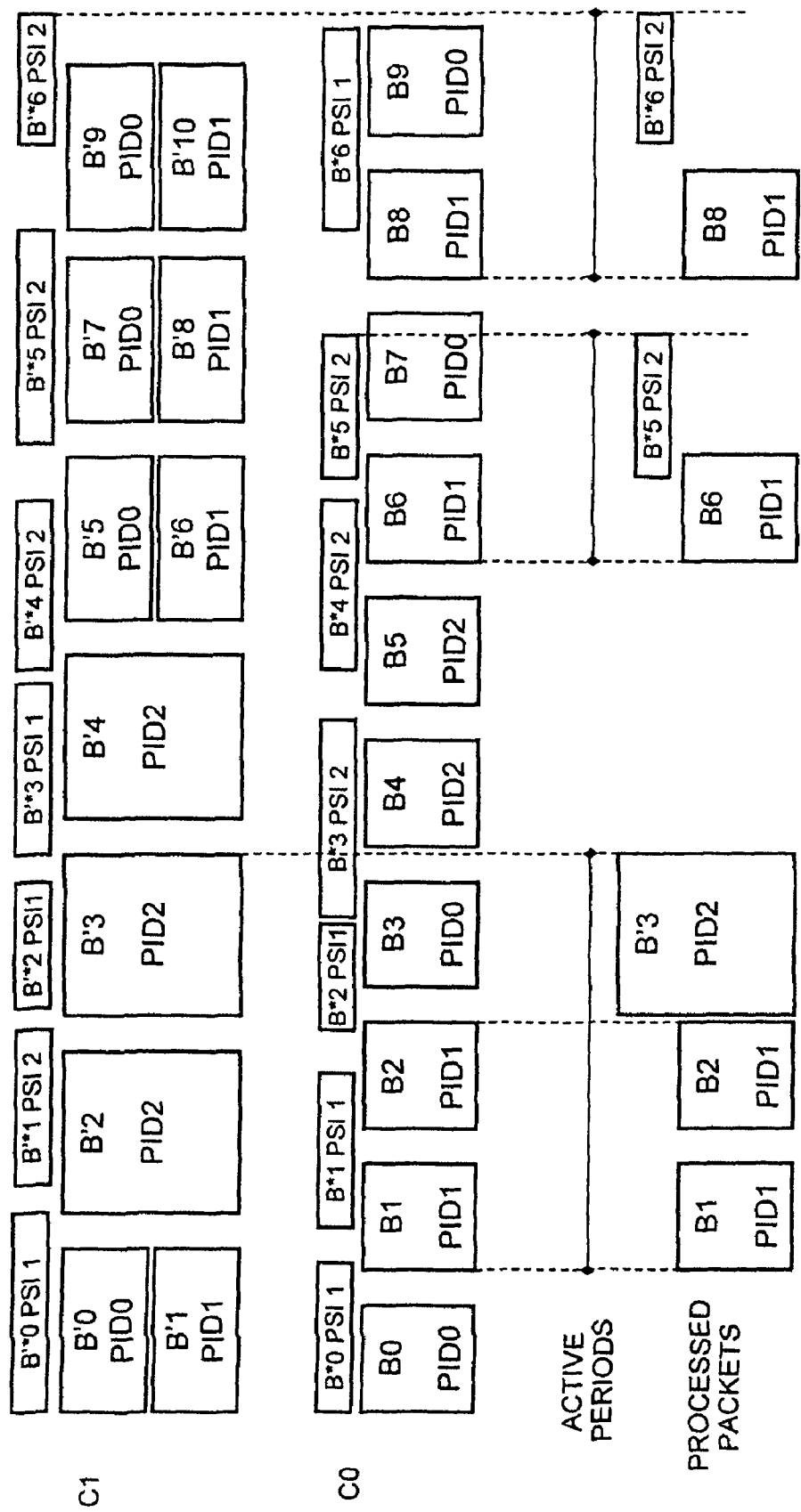

With reference to FIGS. 3, 4 and 5, more details of the determination of the active and idle periods will now be described.

On the first line of FIG. 3 is represented a sequence of bursts received over one specific communication channel. The time line goes from left to right.

Data bursts are referenced B0 to B9 in the order of reception, B0 being the first burst received and B9 the last one. Data packets of bursts B0, B3 and B9 share the same PID, namely PID0. Data packets of bursts B1, B2, B6 and B8 have the identifier PID1 and data packets of bursts B4, B5 and B7 have the identifier PID2.

On line L1, a first embodiment of the determination of the active periods is represented.

In this embodiment, the power management unit is adapted to drive the receiver in an active state only for the reception of bursts of packets with PIDs which are in the PID table 12, corresponding in the example, to the packets with the PID1.

Accordingly, the receiver will turn to an active state under the control of the power management unit 24 for four distinct periods each corresponding to the reception of one data burst with PID1. The receiver is driven back to the idle state after reception of each burst B1, B2, B6 and B8.

In another embodiment, represented on line L2, the power management unit is adapted to take into account the time required for the components to switch between idle and active states. Some components may require time to be powered ON and/or OFF. Accordingly, it is not worth switching between active and idle states if the time interval between two active periods is too short.

This is performed by the estimation or the setup of the duration between each instant of switching to the idle state and the following instant of switching to the active state. If this duration is smaller than a threshold set according to the corresponding component, the two active periods are combined.

In the example represented, the power management unit drives the receiver into a first period of active state to receive both data bursts B1 and B2 and then, to two distinct periods of active state to receive each of data bursts B6 and B8.

In another embodiment represented on line L3, a watchdog feature is implemented meaning that the power management element is adapted to switch back to an idle state once a determined period of time elapsed after the beginning of the reception of a burst to be processed.

In the example, this maximum period of time is set to a value superior to the expected duration of one data packet. Accordingly, even if the receiver fails to retrieve the end of the last data packet of the burst B6, due for example to a loss in the transmission, the power management unit 24 will drive the receiver to the idle state once the expected period of time elapses after the beginning of the reception of the last packet of the burst B6.

In another embodiment represented with reference to line L4, the power management unit is adapted to keep the receiver in an active state for a determined period of time after receiving a data packet with a PID in the PID table 12. In the example, this period of time is called "time out" and corresponds to the duration of the maximum interval between two data packets.

Accordingly, after receiving a data packet such as the last packet of the burst B2 which PID is in the PID table 12, the receiver stays in an active state long enough to receive the PID of the following data packet, namely the first data packet of the burst B3. Thus, the power management unit will drive the receiver to the idle state, only after verifying that the following data packet is not to be processed.

Advantageously, the invention also comprises the use of priority parameters associated with the bursts and transmitted together with the timing information. These priority parameters are used to determine the idle and active periods.

The use of these priority parameters makes it possible to receive efficiently the first burst of a program when no timing information due to a missing previous burst or to receive data bursts which are not transmitted at determined intervals like, for example, PSI and SI metadata bursts.

In a first example, described with reference to FIG. 4, a priority parameter sets the maximum duration of idle state before receiving a burst with the associated PID. Such a priority parameter is referred below as a priority period.

In this example, data bursts and metadata bursts are multiplexed over one communication channel as it is usually done in the DVB transmissions. The stream of data bursts is identical to the stream of data bursts B0 to B9 as described with reference to FIG. 3.

Simultaneously, bursts B*0 to B*6 containing metadata namely program system information (PSI) or system information (SI) are received on the same communication channel. Two different metadata bursts, respectively referenced PSI 1 and PSI 2, are received.

Bursts of data and bursts of metadata are segmented into elementary streams multiplexed and, accordingly, are received and processed simultaneously.

To illustrate the use of priority periods, it is assumed that the PID corresponding to PSI 2 metadata burst is registered in the PID Table 12 before reception of data burst B0 and is removed as soon as a corresponding burst is received.

A first embodiment of the implementation of a priority period is represented on line L5. In this embodiment, the priority associated with the PSI 2 is very high and accordingly the priority period is set to 0. As soon as this instruction message is received from the host 6 by the demodulator 10, the corresponding PID is memorized in the PID table 12 and the timing information and the priority parameter are memorized in the timing table 22. When the power management unit 24 accesses these timing and priority information, it detects the priority period set to 0 and immediately drives the receiver in an active state which is maintained until a metadata burst containing the PSI 2 is received. In the example, the receiver is maintained in the active state until the end of the reception of metadata burst B*3.

The receiver is then switched back to the idle state until the data bursts B6 and B8 are received as described above.

On line L6, another level of priority is represented in which the priority period is set to a value T. Accordingly, the power management unit drives the receiver into the active state once the priority period T has elapsed after the priority information has been accessed by the power management means 24. Of course, in the meantime, the receiver is switched on to receive data bursts B1 and B2.

After the priority period T, the active state is maintained until a burst with the PID PSI 2 is received. In the example, the corresponding metadata burst is B*4.

Once the B*4 burst is received, the power management unit maintains the receiver into the active state in order to complete the reception of data burst B6 as bursts B*4 and B6 overlap each other. The receiver is then switched to the idle state until reception of data packed B8.

Alternatively, as represented in line L7, the priority period associated with PSI 2 burst is infinite. This means that the power management unit will never drive the receiver in an active state for the purpose of receiving the corresponding burst. However, as the PID is memorized in the PID table, the receiver may take advantage of being in an active state to receive this data burst.

This is the case for example when receiving data burst B6. The receiver is in an active state for the processing of data burst B6 and simultaneously the metadata burst B*5 is received. Thus burst B*5 will be processed.

Depending on the setup, the receiver can be switched to the idle state at the end of the reception of the data burst B6 regardless of the status of the reception of the PSI 2 burst or, as represented, can be maintained in the active state until the end of the reception of this metadata burst B*5.

With reference to FIG. 5, another embodiment of the priority parameters is described in which the priority parameters are used to define a hierarchy between bursts.

In the example, several communication channels are monitored by the receiver and each PID registered by the demodulator 10 for reception and processing is associated with a priority level.

More precisely, the example is based on the reception of two data streams, one over a primary channel C0 and the other, over a secondary channel C1. The data stream received over channel C0 is identical to the one described with reference to FIG. 4. The data stream received over channel C1 is also a MPEG-2 DVB-H data stream with data bursts B'0 to B'10 and metadata bursts B*'0 to B'*6.

Five levels of priority are defined, namely 0 to 4. Priority level number 4 corresponds to a data burst on the primary channel that must be processed and priority level number 3 to a metadata burst from on the primary channel. Similarly, priority level number 2 corresponds to a data burst on a secondary channel and priority level number 1 to a metadata burst from on a secondary channel. Priority level zero corresponds to no priority.

The power management means are adapted to power on the demodulator only for the reception of priority level 4 data bursts and to power it off only after checking for the reception of lower levels of priority data bursts. The power management means are also adapted to trigger the frequency shifts of the tuner to shift between the reception channels.

For example, PID1 of channel C0 have a priority level 4, PS2 on C0 a priority level 3, PID 2 on C1 a priority level 2 and PSI2 a priority level 1. All other PIDs have a 0 priority level.

It is assumed that the demodulator is adapted to receive simultaneously several bursts only when they are on the same channel, and that the PID is at the beginning of the burst. This means that the demodulator can detect the PID of a burst only if the beginning of the burst is received. The last line of FIG. 5 represents the processed data bursts.

By use of the timing information, the demodulator will be scheduled to be powered on for reception of data bursts B1, B2, B6 and B8 on the primary channel C0. The demodulator will be off before reception of data burst B1 and switched to active state for bursts B1 and B2.

After the reception of data burst B2, the demodulator checks for lower priority level bursts on the same channel and on the secondary channel. This leads to the reception of burst B'3 on channel C1. After the reception of data burst B'3 only bursts of priority level 0 are being received on the communication channels. The demodulator is thus switched to the idle state only to be powered on again for the reception of data burst B6 of priority level 4.

Simultaneously, when receiving burst B6, the demodulator also receives and processes burst B*5 which is on the same channel and of a lower priority level. Thus the power management means provides power until the end of the reception of burst B*5.

At that stage, the demodulator is powered off and powered on again for the reception of data burst B8. After the reception of burst B8, lower priority level bursts are checked to find burst B'*6 on channel C1.

This embodiment is very efficient for optimization of the active periods of the demodulator. Of course, this embodiment can be extended to several channels under the condition of taking into account the time required to switch between channels in order to ensure the reception of higher priority level bursts.

Of course, further embodiments of the use of priority parameters and combinations of the embodiments described can also be performed.

The method of the invention can also be carried out by a computer program for execution by a processor of a demodulator, the computer program having instructions to perform the following processing when executed by said processor:

receiving from a host processor a list of identifiers of bursts to be processed;

receiving timing information associated with said bursts to be processed;

managing at least some components of said demodulator to drive them between an idle state and an active state depending upon said timing information.

Such a program can be adapted to perform any of the embodiments described above and can be adapted in any kind of articles such as a digital television receiver, computers, PDAs and any other device and the internal components thereof.

The invention claimed is:

1. A demodulator for signals transmitted by bursts of data packets comprising:
    means for receiving from a separate processor identifiers of bursts to be processed;
    means for filtering the signals to retrieve the bursts whose identifiers were received;
    means for processing said retrieved bursts;
    means for receiving from said separate processor timing information associated with the identifiers of bursts to be processed;
    power management means configured for driving at least some components of said demodulator between an idle state and an active state depending upon said timing information; and
    means for receiving priority parameters associated with the burst identifiers, the power management means being configured for driving said components depending upon said priority parameters.

2. The demodulator according to claim 1, wherein said power management means comprises:
    a determining element configured for determining idle and active periods upon said timing information; and
    a control element to drive components between idle and active states during said periods.

3. The demodulator according to claim 2, wherein said determining element is configured for determining an instant and duration of the next active period of each of said components.

4. The demodulator according to claim 1, wherein said power management means are configured for taking into account a required time for the components to switch between active and idle states.

5. The demodulator according to claim 1, wherein said priority parameters set time periods, the power management means being configured for driving the components into the active state if a burst with an identifier associated with a priority parameter is not received after the corresponding time period and to maintain the components active until such a burst is received.

6. The demodulator according to claim 1, wherein said priority parameters set a hierarchy between the data bursts, the power management means being configured for driving the components into the active state for the reception of higher priority level bursts and to drive the components into the idle state when receiving lower priority bursts.

7. The demodulator according to claim 1, wherein the priority parameters are associated with several communication channels and wherein the power management means are configured for triggering shifts of a remote tuner between said communication channels depending upon said priority parameters.

8. The demodulator according to claim 1, wherein said power management means are configured for maintaining the components in an active state at the maximum during a determined period of time after the beginning of the reception of a burst to be processed.

9. The demodulator according to claim 1, wherein said power management means are configured for maintaining the components in an active state at least during a determined period of time after the end of the reception of a burst to be processed.

10. The demodulator according to claim 1, wherein said power management means are configured for driving between active and idle states components within said demodulator and components separate from said demodulator.

11. The demodulator according to claim 1, wherein said means for receiving burst identifiers and said means for receiving timing information comprise a single component configured for separating the burst identifiers and the timing information when received in a common message.

12. A receiver for signals transmitted by bursts of data packets, comprising:
    a host processor; and
    a separate demodulator, wherein said demodulator is the demodulator according to claim 1.

13. A power management method for a demodulator of signals transmitted by bursts of data packets comprising:
    receiving, at the demodulator and from a separate processor, identifiers of bursts to be processed;
    receiving, at the demodulator and from said separate processor, timing information associated with said identifiers of bursts to be processed;
    driving, by the demodulator, at least some components of the demodulator between an idle state and an active state depending upon said timing information; and
    receiving from said separate processor priority parameters associated with burst identifiers, said driving said components being performed by taking into account said priority parameters.

14. The method according to claim 13, comprising receiving a single message comprising a burst identifier and its associated timing information, the method further comprising separating said burst identifier and said timing information.

15. The method according to any claim 13, further comprising removing a burst identifier from the identifiers of bursts to be processed in response to reception of a message comprising said burst identifier without timing information.

16. A non-transitory computer readable medium storing a computer program for a demodulator of signals transmitted by bursts of data packets, the computer program having instructions to perform the following processing when executed by a processor of said demodulator:
    receiving from a processor separate from the demodulator identifiers of bursts to be processed;
    receiving timing information associated with said bursts to be processed;
    controlling at least some components of said demodulator to drive them between an idle state and an active state depending upon said timing information;
    receiving priority parameters associated with the burst identifiers; and
    driving said components depending upon said priority parameters.

17. A receiver for receiving signals transmitted by burst of data packets, comprising:
    a co-processor for:
        receiving bursts containing timing information and priority parameters;
        processing the bursts; and
        driving at least some components of the co-processor between an idle state and an active state depending upon the timing information and the priority parameters, wherein the co-processor is for receiving identifiers of bursts, the timing information being associated with the identifiers of bursts; and wherein the receiver further comprises:
- means for filtering the signal to retrieve the bursts whose identifiers were received, and
- a host-processor configured for transmitting the identifiers of bursts and the timing information, to the co-processor; the host-processor being built on another chip than the co-processor.

18. A demodulator for signals transmitted by bursts of data packets comprising a computer for:
- receiving, from a separate processor, identifiers of bursts to be processed;
- filtering the signals to retrieve the bursts whose identifiers were received;
- processing said retrieved bursts,
- receiving from said separate processor timing information associated with the identifiers of bursts to be processed;
- driving at least some components of said demodulator between an idle state and an active state depending upon said timing information; and
- receiving priority parameters associated with the burst identifiers, the computer being configured for driving said components depending upon said priority parameters.

* * * * *